April 20, 1965  G. H. MOREY  3,179,779
APPARATUS FOR HEATING CORROSIVE LIQUIDS
Filed Nov. 15, 1961
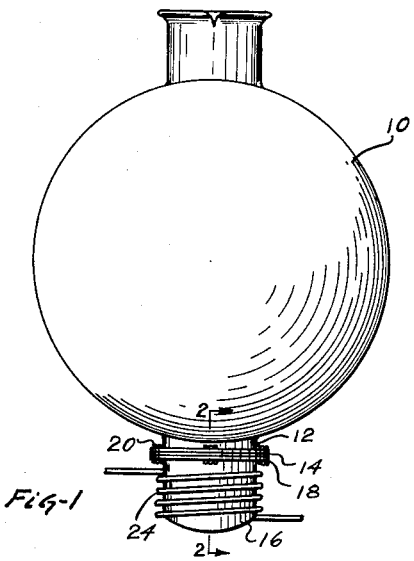
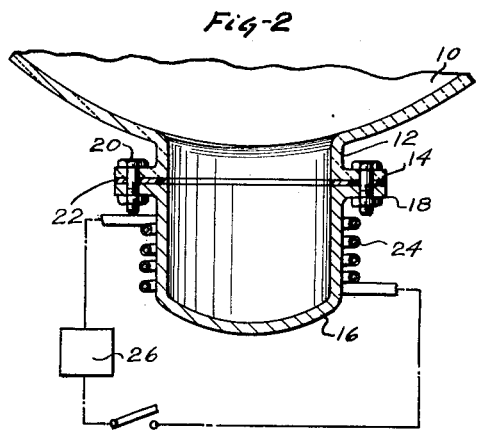
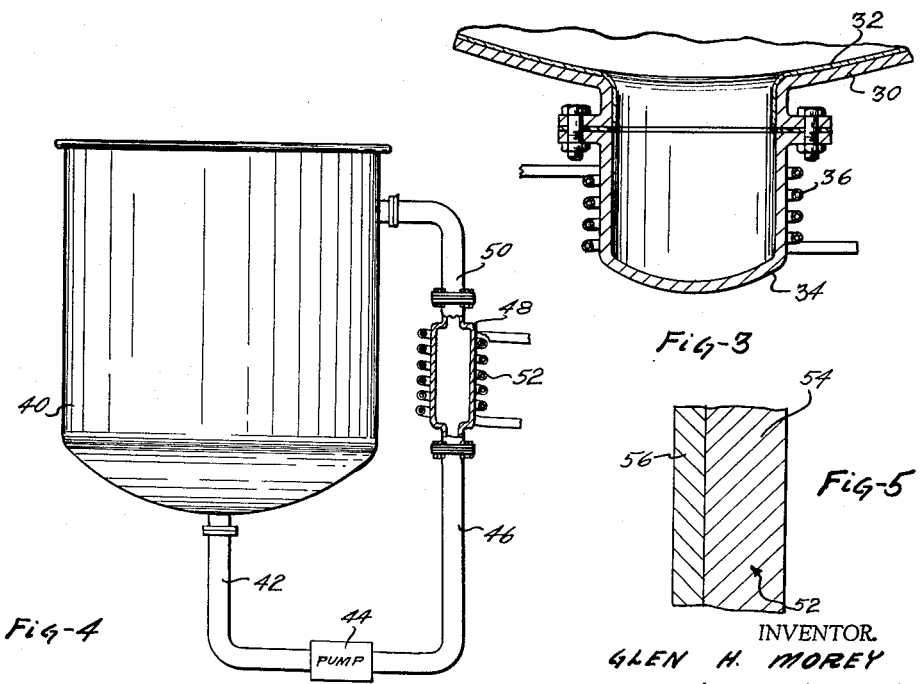
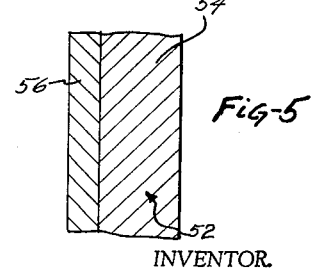
INVENTOR.
GLEN H. MOREY
BY Toulmin & Toulmin
ATTORNEYS

United States Patent Office 3,179,779
Patented Apr. 20, 1965

3,179,779
APPARATUS FOR HEATING CORROSIVE LIQUIDS
Glen H. Morey, Terre Haute, Ind., assignor to Templeton Coal Company, Terre Haute, Ind., a corporation of Indiana
Filed Nov. 15, 1961, Ser. No. 152,553
4 Claims. (Cl. 219—10.49)

This invention relates to apparatus for heating liquids, particularly corrosive liquids.

The occasion arises many times in the manufacture and processing of chemicals to heat corrosive chemicals, and this always creates a problem, particularly where large bodies of the corrosive liquids are to be heated. Heretofore, these corrosive liquids have been placed in large glass lined or glass flasks or kettles, and the heat has been transferred into the liquid through the glass wall containing the liquid. This method has significant disadvantages, including the fact that even at the best, there is a relatively high temperature gradient between the source of heat and the inside wall of the kettle, which makes for inefficiency. Also, if the heat per square inch is too high, the glass, where it is a bonded lining, will tend to chip off the container.

Still further, a particularly objectionable disadvantage arises when there are inflammable or explosive vapors present, because, where electric heaters are used and are operated above a predetermined temperature, they are apt to cause the vapors to explode. On account of the temperature lag between such a heating element and the inside of the kettle or flask walls, it is a common practice to operate such heating elements at red hot temperatures and the danger referred to is thus frequently encountered.

The present invention has a particular object the provision of an arrangement for heating corrosive liquids which completely eliminates the disadvantages referred to above that have existed heretofore.

Another particular object of this invention is the provision of apparatus for heating corrosive liquids which is more efficient than heretofore known methods.

A still further object of this invention is the provision of an apparatus in which corrosive liquids can be heated that can easily be modified to adapt the apparatus to different chemicals, so that all types of corrosive chemicals can be heated in the apparatus.

A still further object of this invention is the provision of apparatus for heating corrosive liquids in which, simultaneous with the heating of the liquids, a mixing of the liquid is carried out, but with the aforesaid efficiency of heating of the liquid being maintained.

These and other objects of this invention will become apparent from the following detailed description and accompanying drawings wherein:

FIGURE 1 is an elevational view of a relatively large glass flask having a heating arrangement according to this invention associated therewith;

FIGURE 2 is a vertical sectional view indicated by line 2—2 in FIGURE 1 and drawn at somewhat enlarged scale;

FIGURE 3 is a fragmentary view similar to FIGURE 2, but showing a somewhat different construction for the flask or kettle;

FIGURE 4 is an elevational view similar to FIGURE 1 but showing an arrangement wherein the liquid is heated externally of the kettle and is pumped in a circulatory path from and back to the kettle; and FIGURE 5 is a fragmentary view showing a fragment of the wall of the heating chamber of the FIGURE 4 arrangement, illustrating one manner in which the heating chamber can be protected against corrosion.

Referring now to the drawings more in detail, FIGURE 1 shows a relatively large glass flask 10. At the bottom of the flask 10 there is a projecting neck 12 terminating in a flange 14. This flange 14 is availed of for connecting to the flask a metallic well forming a heating chamber. This well indicated at 16 has a flange 18 at the top that is bolted to flange 14 of the flask by bolts 20 and with an intervening corrosion-resistant gasket 22 which may be of a plastic material, such as Teflon.

The well 16 is of metal and is constructed from a material such as tantalum, titanium, vanadium, or the like, or any other metal or alloy thereof that will resist attack by hot corrosive liquids. The well 16 has arranged in surrounding relation thereto an induction coil 24 adapted for energization from a source of high frequency electrical energy, such as the high frequency generator 26.

It will be evident that energization of coil 24 will cause energy to be transferred electro-magnetically into well 16, which will then become heated due to eddy current therein, and this heat will be transferred into the liquid in the well, which, in turn, on account of the natural convection currents developed therein, will rise upwardly in the flask, thereby conveying the heat into the body of liquid in the flask.

It will be evident that there will be efficient transfer of heat from the metal well into the liquid because the liquid directly contacts the surface of the metal well. For this reason the temperature of the metal well will never increase to the point that explosive or inflammable vapors that might come in contact therewith would be caused to explode or burn.

Still further, it will be evident that it would be a simple matter to provide insulation about the well that would not only prevent loss of heat therefrom to the surrounding atmosphere, but would also shield it from surrounding vapors.

Conventional insulating practices could be employed for enclosing either the well alone in insulating material, or the well and the heating elements together, or to provide individual insulating shields or covers for each of the well and the induction coil.

The flask 10 in FIGURES 1 and 2 is made of glass, but it is also possible to form this flask of metal and to line it with glass according to known practices. This is illustrated in FIGURE 3 wherein 30 indicates the metal body of the flask and 32 indicates the glass lining layer. In this arrangement there is a well 34 attached to the bottom of the flask and an induction coil 36 surrounds the well.

On account of the fact that the heat is all developed in the well and is transferred therefrom into the liquid in the flask, thus eliminating extremely high temperature differences between the flask and the well, there would not be sufficient differential expansion between the well and flask to impose strains on either beyond allowable limits. This is true in connection with both of the modifications of FIGURES 2 and 3.

In FIGURE 4 there is shown an arrangement wherein liquid is contained within a flask or kettle 40; but this arrangement does not have a heating well or chamber attached to the bottom thereof. Instead, a conduit 42 leads from the bottom of the kettle to a pump 44 and from pump 44 a conduit 46 leads to a heating chamber or cylinder 48, from the top of which another conduit 50 leads back into the kettle or flask. An induction coil 52 surrounds cylinder 48 and transfers energy thereto in the same manner as has been described in connection with the induction coils and wells of FIGURES 2 and 3.

The cylinder 48 of FIGURE 4 can be constructed as illustrated in FIGURE 5, with a relatively cheap metal outer wall 54 and a corrosion-resistant metal inner liner 56, which might be titanium, tantalum or vanadium, or any of the other metals which will resist attack by hot corrosive liquids.

The conduits and pump could consist of corrosion-resistant material of a suitable nature, such as plastic, or glass, or ceramic, any of which would normally be satisfactory. The circulation of the liquid in the FIGURE 4 modification prevents the cylinder from reaching temperatures as high as are reached when a well, according to FIGURES 1-3 is used, and the cylinder thus presents the possibility of being lined with glass instead of metal.

The arrangement of FIGURE 4 provides for much more rapid mixing of the liquid than the previously described modifications, so that the temperature of the entire body of liquid will at all times be substantially uniform. The heating principle, however, is the same.

In connection with all of the modifications, it will be appreciated that the well or the heated cylinder is relatively small and that it can, therefore, be made of an extremely expensive material, such as the metals referred to above, without involving an unbearable expense.

Still further, a plurality of wells could be provided so that if one material is unsuitable for a certain liquid to be heated, another might be, and vice versa. The provision of extra wells would permit the installation to be adapted readily to any given circumstance and, again, without the cost of the wells being excessive on account of their relatively small size.

In any case also there are no glowing elements so that the possibility of fire or explosion is greatly reduced and, in most cases, is completely eliminated.

It will be understood that this invention is susceptible to modification in order to adapt it to different usages and conditions; and, accordingly, it is desired to comprehend such modifications within this invention as may fall within the scope of the appended claims.

I claim:

1. An apparatus for heating liquids comprising; a container having at least that portion which contacts the liquid therein made of a glass-like material, said container having a port in the bottom, a well directly beneath the container and connected sealingly to the bottom of the container about the periphery of said port and opening upwardly directly into the container to receive liquid therefrom, said well being of electrically conductive material and at least the inner surface being of corrosion resistant said well material, being capable of withstanding a relatively high degree of heat and a relatively high temperature gradient through the wall without damage, and means for heating said well by electromagnetic induction, said well being substantially smaller than said container.

2. An apparatus for heating corrosive liquids comprising; a container for containing the liquid and having at least the inner liquid contacting surface of a glass-like material, a port in the bottom of the container, an upwardly opening well substantially smaller than the container attached to the container in sealing relation to said port so the liquid in the well is in direct communication with the liquid in the container, said well being made of corrosion resistant metal, a coil surrounding said well, and means for energizing said coil with high frequency electrical energy thereby to heat said well by electromagnetic induction whereby liquid exchange will take place between the container and the well by vertical convection currents.

3. An apparatus for heating corrosive liquids comprising; a container for containing the liquid and having at least the inner liquid contacting surface of a glass-like material, a flanged port in the bottom of the container, an upwardly opening well substantially smaller than the container attached to the container in sealing relation to said port so the liquid in the well is in direct communication with the liquid in the container, said well being made of corrosion resistant metal, said well having its open end flanged and a gasket compressed between the flanges of said port and well forming the sealed connection of the well to the port, a coil surrounding the well, and means for supplying high frequency electrical energy to said coil to heat the well by electromagnetic induction whereby liquid exchange will take place between the container and the well by vertical convection currents.

4. An apparatus for heating corrosive liquids comprising; a container for containing the liquid and having at least the inner liquid contacting surface of a glass-like material, a port in the bottom of the container, an upwardly opening well substantially smaller than the container attached to the container in sealing relation to said port so the liquid in the well is direct in communication with the liquid in the container, said well being made of corrosion resistant metal, a coil surrounding said well, and means for energizing said coil with high frequency electrical energy thereby to heat said well by electromagnetic induction whereby liquid exchange will take place between the container and the well by vertical convection currents, the metal from which the well is made being selected from the group of metals which includes vanadium, tantalum, and titanium.

References Cited by the Examiner

UNITED STATES PATENTS

| 479,814 | 8/92 | Kennedy | 219—10.51 |
| 932,242 | 8/09 | Berry | 219—10.49 |
| 1,513,087 | 10/24 | Buhl et al. | 219—10.51 |
| 1,887,849 | 11/32 | Pierce | 99—283 |
| 2,356,784 | 8/44 | Graham | 99—283 |
| 2,801,326 | 7/57 | Sullivan | 219—436 |
| 2,916,599 | 12/59 | Stiles | 219—436 |
| 3,059,092 | 10/62 | Olson | 219—441 |

FOREIGN PATENTS 510,291  7/39  Great Britain.

RICHARD M. WOOD, *Primary Examiner.*

MAX L. LEVY, *Examiner.*